June 16, 1925.
J. R. COLEMAN
COTTER PIN
Filed July 22, 1924
1,542,493
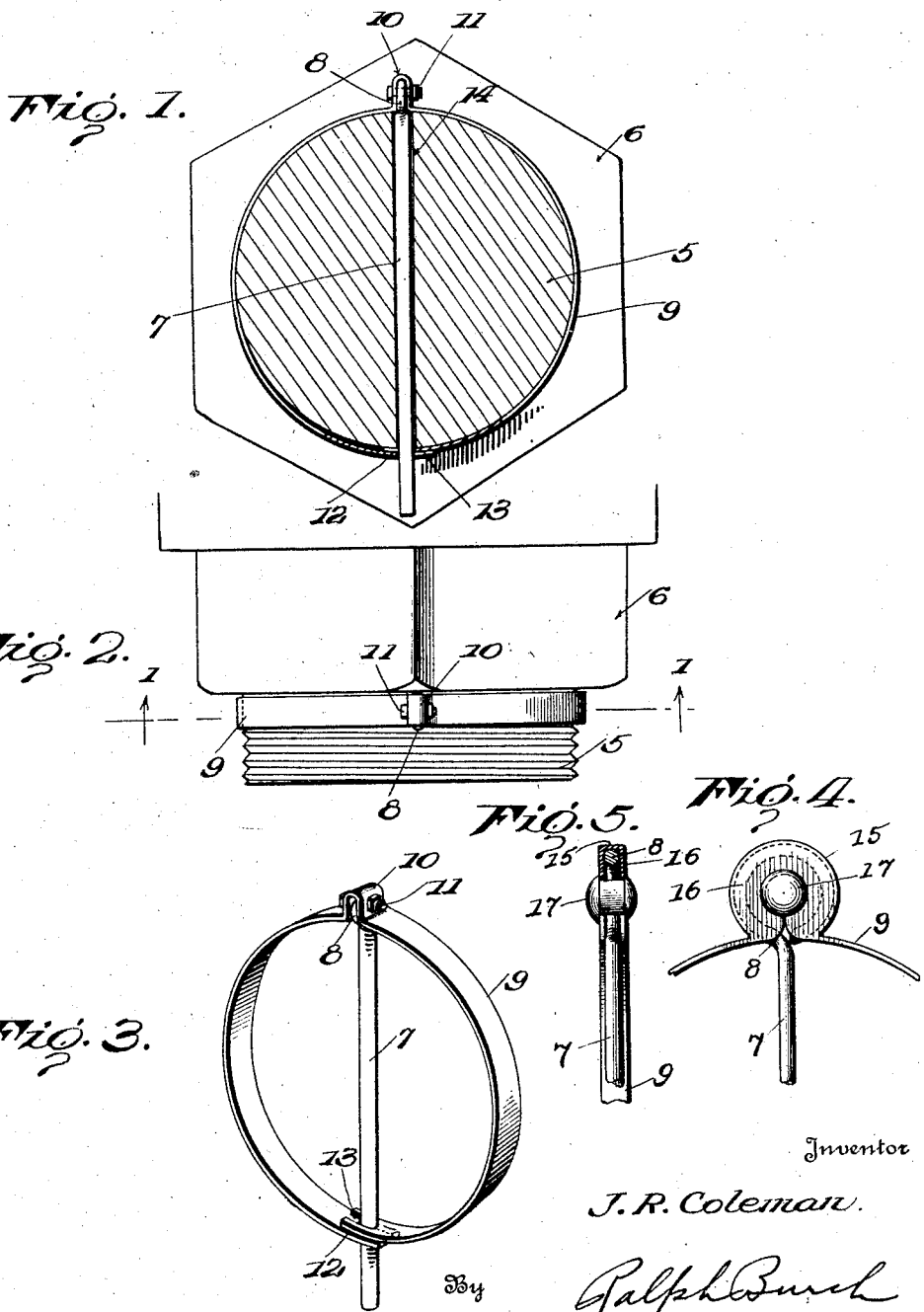
Inventor
J. R. Coleman.
By Ralph Burch
Attorney Patented June 16, 1925.

1,542,493

UNITED STATES PATENT OFFICE.

JAMES R. COLEMAN, OF WASHINGTON, DISTRICT OF COLUMBIA.

COTTER PIN.

Application filed July 22, 1924. Serial No. 727,462.

*To all whom it may concern:*

Be it known that I, JAMES R. COLEMAN, a citizen of the United States, residing at Washington, in the District of Columbia, have invented certain new and useful Improvements in Cotter Pins, of which the following is a specification.

My invention relates to improvements in cotter pins and has for its object to provide locking means which will obviate the necessity of splitting and bending the ends of the pin in order to retain it in place.

A further object of the invention is to provide resilient locking means for cotter pins which will permit ready insertion and removal of the pin without the use of tools.

Another object of the invention is to provide an invention of the above character which is simple and durable in construction, reliable and efficient in operation and inexpensive to manufacture.

Other objects and advantages of the invention will be apparent during the course of the following description.

In the accompanying drawing, forming a part of this specification and in which like numerals are employed to designate like parts throughout the same, Fig. 1, is a cross sectional view on line 1—1 of Fig. 2, Fig. 2, is a top view of the pin as applied to a bolt or shaft, Fig. 3, is a perspective view of the pin, Fig. 4, is a fragmentary side elevation of a modified form, and, Fig. 5, is a longitudinal sectional view of Fig. 4.

Referring to the drawing, wherein for the purpose of illustration I have shown a preferred embodiment of my invention the numeral 5 designates a bolt or shaft having a nut 6 threaded thereon and locked in place by my improved cotter pin. While the pin is shown as used in connection with fastening a nut on a bolt it is to be understood that the same may be used for various other purposes.

The pin comprises a solid shank 7 having an enlarged eyelet 8 formed at one end. A split band 9 is provided with a yoke 10 intermediate its ends which fits over the eyelet 8 and is secured thereto by a bolt 11 passing through the yoke and eyelet. The ends of the band overlap, as at 12, and are bifurcated, as at 13, to receive the lower end of the shank 7. The band is constructed of flexible material which by reason of its resiliency will cause the bifurcated ends to securely grip the shank. As more clearly shown in Fig. 1, the pin is inserted in the bore 14 extending longitudinally through the bolt and the band encircles the bolt so the ends will resiliently grip the lower end of the pin projecting from the bolt preventing accidental displacement of the pin.

In Figs. 4 and 5, I have illustrated a modified form of the invention in which the intermediate portion 15 of the band 9 is bent to encircle the eyelet 8 of the pin 7. The portion 15 encircling the band having flanges 16 bent inwardly at right angles with a rivet 17 passing through the center, securely holding the band in place.

Thus it is seen that a safe and reliable lock is provided for the pin which will facilitate the application and removal of the pin. To apply the pin the band is spread sufficiently to pass around the object through which the pin extends and when released will automatically contract so the ends will grip the projecting end of the pin. To withdraw, a slight pull on the head of the pin will spread the band and permit extraction of the pin.

It is to be understood that the form of my invention herewith shown and described is to be taken as a preferred example of the same, and that certain changes in the shape, size and arrangement of parts may be resorted to without departing from the spirit of the invention or the scope of the subjoined claims.

Having thus described my invention, I claim:

1. A device of the character described comprising a shank, and a split band joined intermediate its ends to one end of said shank, the ends of said band having bifurcations engaging said shank.

2. A device of the character described comprising a shank, and a split band secured to one end of the shank, the ends of said band overlapping and having bifurcations to receive the opposite end of said shank.

3. A device of the character described comprising a shank having an eyelet at one end, a flexible split band and a yoke formed intermediate the ends of said band adapted to fit over said eyelet and secured thereto, the ends of said band overlapping and bifurcated to receive said shank.

4. A device of the character described comprising a shank having an eyelet at one end, and a split band, said band having its intermediate portion curved to encircle said eyelet with inwardly directed flanges.

5. A device of the character described comprising a shank having an eyelet at one end, a split band having its intermediate portion curved to encircle said eyelet, said intermediate portion having inwardly directed flanges covering said eyelet and a rivet passing through said flanges and eyelet.

6. A device of the character described comprising a shank having an eyelet at one end and a split band having a circular curved channel portion intermediate its ends to fit over the eyelet of said shank.

In testimony whereof I affix my signature

JAMES R. COLEMAN.